United States Patent
Zukerman et al.

(10) Patent No.: US 7,351,439 B2
(45) Date of Patent: Apr. 1, 2008

(54) PROCESS FOR PRODUCING HIGH-MOISTURE, SMOOTH-TEXTURED SHAPED CEREAL FOODS

(76) Inventors: Harold W. Zukerman, 4125 W. Yorkshire La., Northbrook, IL (US) 60062; Rachel B. Zukerman, 4125 W. Yorkshire La., Northbrook, IL (US) 60062

( * ) Notice: Subject to any disclaimer, the term of this patent is extended or adjusted under 35 U.S.C. 154(b) by 496 days.

(21) Appl. No.: 11/181,757

(22) Filed: Jul. 15, 2005

(65) Prior Publication Data

US 2005/0249859 A1      Nov. 10, 2005

Related U.S. Application Data

(63) Continuation-in-part of application No. 10/189,830, filed on Jul. 8, 2002, now abandoned.

(51) Int. Cl.
   *A23L 1/164*   (2006.01)
(52) U.S. Cl. .................. 426/506; 426/508; 426/512; 426/515; 426/516; 426/517; 426/519; 426/523; 426/540; 426/580; 426/620; 426/654
(58) Field of Classification Search ............... 426/506, 426/508, 512, 515, 516, 517, 519, 523, 540, 426/620, 654, 580
See application file for complete search history.

(56) References Cited

U.S. PATENT DOCUMENTS 3,745,019 A  *  7/1973  Huxsoll et al. ............. 426/290

5,137,745 A  *  8/1992  Zukerman et al. .......... 426/618

OTHER PUBLICATIONS

Kloss, J. The Back to Eden Cookbook, Woodbridge Press, Woodbridge Press Publishing Co. P. O., Santa Barbara, CA, 1974, p. 81.*

Fabian et al. "Development and storage study of deep-fried high-protein crunchies", abstract only, Phillipine Journal of Nutrition (1979, 32(2), p. 92-98.*

* cited by examiner

*Primary Examiner*—Helen Pratt

(57) ABSTRACT

The present invention provides a process for making hand-held shaped cereal and milk products having a smooth, homogenous-consistency texture and a moisture content higher than 35%, using about the same amount and ratio of cereal flour to fluid-milk as found in a traditional combination of (RTE) cereal pieces (made from cereal flour) and fluid-milk that have to be eaten from a bowl with a spoon. In the process of the present invention, each pound of cereal flour is cooked with 3 to 4 pounds of fluid-milk together with starch-complexing agents in a continuous cooker at temperatures above 175 F. It is then discharged as a hot, fluid-milk-hydrated, starch-complexed cereal flour which continues to absorb retained fluid-milk until it becomes fully-cooked, fully-hydrated and viscous enough to retain a shape. It is then formed into units, baked to firm their textures while retaining a higher than 35% moisture, and stored refrigerated or frozen.

20 Claims, No Drawings

PROCESS FOR PRODUCING HIGH-MOISTURE, SMOOTH-TEXTURED SHAPED CEREAL FOODS

REFERENCE TO PRIOR ART APPLICATION

This application is a continuation in-part of U.S. application Ser. No. 10/189,830 Filed Jul. 8, 2002 now abandoned.

BACKGROUND OF THE INVENTION

The prior art teaches numerous processes for making low-moisture food products from cereal flour, water and/or milk.

The (USDA) teaches a process for making low moisture (20%-30% moisture) fat-fried rice fries from rice flour and water. Published in the Journal of Food Science Vol. 66 No. 4, 2001 page. 610, said article teaches a process whereby rice flour and a small amount of water are blended together and extruded through a high-shear, fast-rotating, screw-type extruder to form rice fries strands, which are then fat-fried. The referenced USDA article further states that with the USDA process, higher levels of moisture cannot be used because it makes the extruded rice flour/water strands become so fluid that they are not able to retain a formed shape.

There are several prior art Zukerman et al patents that teach processes for making Shaped Grain Products that look, taste and have "visible, cooked grain-textures" and appearances. This is because they all utilize visible cereal grains as a raw material in order to make the finished products comprised of individual, cooked visible cereal grains that are joined to each other. Also, the cooking process used to make the prior art Zukerman et al visible grain textured products requires process equipment that is able to cook the individual raw cereal grains for a much longer period of time because when cooking raw visible cereal grains, the fluid has to be infused from the surface of the grains into their centers.

The products of the present invention are in sharp contrast to the Zukerman prior art patents because said present invention products are made from finely milled cereal flour which produces finished products comprised of fluid-milk hydrated, starch-complexed cereal flour having smooth, homogeneous-consistency textures and appearances. The products of the present invention are also made by a very rapid cooking process because cereal flour is a finely milled powder which is able to absorb hot water and/or hot fluid-milk very rapidly, even instantaneously.

In the prior art, the traditional dry cereal and fluid-milk breakfast is made by combining about one ounce of the RTE (ready-to-eat) low-density cereal pieces (which are made from cereal flour) together with about four ounces of fluid-milk to make a "fluid-combination" that has to be eaten from a bowl with a spoon. Consumers who pick-up breakfast "on-the-go" are now avoiding the traditional bowl of dry cereal and fluid-milk because it is impossible to eat a "fluid-combination" in a moving car. For that reason, dry and intermediate-moisture cereal bars and cereal and milk bars which are made by processes that are well known in the prior art, are now being used as snacks or as a replacement for the traditional bowl of cereal and fluid-milk. The problem is that in order for these prior art dry and intermediate moisture cereal bar products to have their shelf-stable properties which prevent the products from spoiling, they are required to use preservation systems that cannot support the use of high levels of moisture. Therefore, dry and intermediate moisture prior art products cannot be made with high levels of water or with the same amount of fluid-milk as in a traditional cereal and fluid-milk combination. To be more specific, dry cereal bars and cereal and milk bars have a very-dry taste and texture because they contain less than 10% moisture. Intermediate moisture (shelf-stable) cereal bars, sport bars, diet bars and cereal & milk bars are required to be formulated with less than about 35% moisture because higher moisture levels will greatly increase the products' water activity which will in turn cause the products to spoil. For that reason, intermediate moisture cereal bars are usually formulated with glycerin, corn syrups and sugar syrups which provide the products' with soft-moist textures, high levels of soluble solids and water activity (Aw) below 0.75. For that reason, they taste like the added glycerin and corn syrup they are made with. They do not taste like a traditional cereal and fluid-milk combination.

BRIEF SUMMARY OF THE INVENTION

The present invention provides a process for making hand-held shaped cereal and milk products having a smooth, homogenous-consistency texture and a moisture content higher than 35%, using about the same amount and ratio of cereal flour to fluid-milk as found in a traditional combination of (RTE) cereal pieces (made from cereal flour) and fluid-milk that have to be eaten from a bowl with a spoon.

In the process of the present invention, each pound of cereal flour is cooked with three to four pounds of fluid-milk together with starch-complexing agents in a continuous cooker at temperatures above 175 F. It is then discharged as a hot, fluid-milk-hydrated, starch-complexed cereal flour which continues to absorb retained fluid-milk until it becomes fully-cooked, fully-hydrated and viscous enough to retain a shape. It is then cut or formed into units, baked at temperatures higher than 300 F to firm their textures while retaining a higher than 35% moisture, and then stored refrigerated or frozen.

The starch-complexing agents can be added to the continuous cooker either as a fluid-dispersion with the fluid-milk or said starch-complexing agents can be pre-blended with either the dry cereal flour or the dry flavoring ingredients. Starch-complexing agents are used to complex the amylose and amylopectin of the cereal flour during the cooking process which helps provide improved freeze-thaw stability properties. In addition, the starch-complexing agents also help to maintain uniform dispersion of the milk-fat throughout the cooking process. Finally, the starch-complexing agents provide "lubricity" which prevents the very-sticky, fluid-milk-hydrated cereal flour from sticking to the equipment during processing.

It is the primary object of the present invention to provide a process for making hand-held shaped cereal and milk products having a smooth, homogenous-consistency texture and a moisture content higher than 35%, using about the same amount and ratio of cereal flour to fluid-milk as found in a traditional combination of (RTE) cereal pieces (made from cereal flour) and fluid-milk that have to be eaten from a bowl with a spoon.

It is another object of the present invention to provide a process for producing from rice flour and water, a higher than 35% moisture rice fries product having a smooth, homogenous-consistency texture and appearance which is similar to French-fried potatoes.

DESCRIPTION OF THE PREFERRED EMBODIMENT

The present invention provides a process for making hand-held shaped cereal and milk products having a smooth, homogenous-consistency texture and a moisture content higher than 35%, using about the same amount and ratio of cereal flour to fluid-milk as found in a traditional combination of (RTE) cereal pieces (made from cereal flour) and fluid-milk that have to be eaten from a bowl with a spoon.

In the process of the present invention, each pound of cereal flour is cooked with three to four pounds of fluid-milk together with starch-complexing agents in a continuous cooker at temperatures above 175 F. It is then discharged as a hot, fluid-milk-hydrated, starch-complexed cereal flour which continues to absorb retained fluid-milk until it becomes fully-cooked, fully-hydrated and viscous enough to retain a shape. It is then cut or formed into units, baked at temperatures higher than 300 F to firm their textures while retaining a higher than 35% moisture, and then stored refrigerated or frozen.

The cooking step of the process of the present invention has to be accomplished in a manner whereby four pounds of fluid-milk is absorbed into each pound of finely milled cereal flour without creating a pasty tasting product which does not have the fluid-milk holding capacity needed to retain the desired higher than 35% moisture in the finished product.

When all four pounds of fluid-milk are infused into each pound of cereal flour, as taught in the present invention, the rate of fluid-milk absorption and the amount of shear imparted to the cooking fluid-milk hydrating cereal flour is important because it can affect the taste and texture of the finished product. To be more specific, if the starch granules of the cereal flour absorb all the fluid-milk too rapidly, said starch granules can become over-bloated and burst. Also, excessive mechanical mixing (shear) could also mechanically destroy the starch granules of the fluid-milk-hydrated, starch-complexed cereal flour. For these reasons, it is a preferred embodiment of the present invention to have all four pounds of fluid-milk absorbed into each pound of cereal flour in a manner that will not completely rupture or destroy all the starch granules of said cereal flour.

Continuous cookers equipped with scraper agitators are ideal for this application because they create a minimum amount of shear while continuously mixing the cereal flour and fluid-milk while scraping the surfaces of the continuous cooker to prevent burn-on. Very high-speed, shear-type mixers are less desirable because they will rupture the starch granules of the cereal flour. There are also several techniques that can be employed for slowing down the rate of fluid-milk absorption. One technique is to pre-coat the cereal flour with oil before it is cooked with the fluid-milk. The rate of mechanical shear applied and the rate of fluid-milk absorption can also be reduced if the final absorption of the fluid-milk into the cereal flour occurs on a belt-conveyor that does not have mechanical agitation.

The fluid-milk used to cook the cereal flour is selected from the group consisting of full-fat fluid-milk, low-fat fluid-milk, fat-free fluid-milk, buttermilk, concentrated milk diluted with water or powdered milk diluted with water, powdered whey, whey proteins, powdered milk proteins and combinations thereof.

The cereal flour used to make the products is made by milling cereal grains selected from the group consisting of corn, oats, rice, wheat, barley, rye and combinations thereof. Starch-complexing agents are primarily used to complex the amylose and amylopectin of the cereal flour during the cooking process. Starch-complexing agents help improve the freeze-thaw stability properties of the finished product which is later frozen and stored frozen. In addition, they are also very helpful in maintaining a uniform dispersion of the fat throughout the cooking process. Finally, starch-complexing agents provide "lubricity" which is needed to prevent the very-sticky, fluid-milk hydrated cereal flour from sticking to the equipment during processing. Starch-complexing agents can be added to the continuous cooker either as a pre-blended fluid-dispersion with the fluid-milk or they can be pre-blended with either the dry cereal flour or dry flavoring ingredients.

The starch-complexing agents cooked with the cereal flour and fluid milk are selected from the group consisting of lecithin, partially hydrolyzed lecithin, enzymatically hydrolyzed lecithin, hydrolyzed lecithin, modified lecithin, glycerol monostearate, glycerol monolaurate, glycerol monomyristate, glycerol monopalmitate, glycerol monoarachidate, glycerol monooleate, glycerol monolinoleate, fatty acid monoesters of ethylene, sorbitan fatty acids esters, fatty acid monoesters of propylene glycol, calcium stearoyl-2-lactylate, sodium stearoyl-2-lactylate, polyoxyethylene monostearate, sodium stearoyl fumarate, succinylated monoglycerides, and combinations thereof.

The cereal flour, fluid-milk and starch-complexing agents can also be cooked together with ingredients selected from the group consisting of food colors, food flavors such as vanilla, chocolate, cinnamon, gums, salt, sugar substitutes such as Splenda and Aspartame, fat, oil, butter, cheese, sugar, nutritional supplements, gums and water binding agents and combinations thereof.

When the fluid-milk hydrated starch-complexed cereal flour is discharged from the continuous cooker, it is a viscous fluid that still retains some hot fluid-milk that has not yet been absorbed into the starch granules of the cereal flour. The final amount of fluid-milk can then be slowly absorbed into the starch granules of the hydrating cereal flour without any additional mechanical agitation whatsoever. When the viscous fluid-milk-hydrated, starch-complexed cereal flour has becomes fully-cooked, fully-hydrated and viscous enough to retain a shape, it is then cut or formed into units with low-sheer formers.

Fluid-milk hydrated starch complexed cereal flour bar-shaped units are formed by depositing a viscous sheet of fluid-milk hydrated, starch complexed cereal flour from the continuous cooker onto a conveyor belt while it is hot and still-absorbing adhering fluid milk. When the fluid-milk-hydrated starch-complexed, cereal flour has absorb all the adhering fluid-milk and become fully-cooked, fully-hydrated and viscous enough to retain a shape, said sheet is cut into bar-shaped units with rotary and guillotine cutters. Rotary and guillotine cutters are well-known in the art and commercially available.

Fluid-milk hydrated starch complexed cereal flour bar-shaped units can also be topped with food particles selected from the group consisting of chocolate chips, cinnamon chips, cereal grains, raisins, nuts, diced fruit and combinations thereof. The food particles are added onto and pressed into the surface of the sheet of the fluid-milk-hydrated, starch-complexed cereal flour before said sheet is cut into bar-shaped units.

Fluid-milk hydrated, starch complexed cereal flour round and oval shaped units can be formed with Double Roll Formers equipped with cookie-shaped depositors. If desired, said deposited cookie shaped units can be further enhanced by adding onto and pressed into their surfaces food particles selected from the group consisting of chocolate chips, cinnamon chips, cereal grains, raisins, nuts, diced fruit and combinations thereof before deposited units are oven-baked.

Fluid-milk hydrated starch complexed cereal flour stick shaped units can also be formed with Double Roll Formers by extruding continuous ribbons of fluid-milk starch-complexed, hydrated cereal flour through the die plate holes of a Double Roll Former and then cutting said continuous ribbons into units with a guillotine cutter. Double-roll formers and guillotine cutters are well-known in the art and commercially available.

The third step in the process is oven-baking the fluid-milk hydrated starch complexed cereal flour units at temperatures higher than 300 F to firm their textures while retaining a higher than 35% moisture content. Oven-baking can be accomplished at temperatures between about 300 F and 400 F in a continuous hot-air oven. Ovens are well-known in the art and commercially available.

If desired, the oven-baked units can then be stored refrigerated or frozen and stored frozen. The freezing step can be accomplished with either cold air, liquid nitrogen, or liquid carbon dioxide. Freezers are well-known in the art and are commercially available.

The following two examples will further illustrate the invention, but it is not intended that the invention be limited to the details set forth therein.

EXAMPLE 1

Cereal and Milk in a Cookie

This example teaches a process for making from a mixture of rice flour, oat flour and fluid-milk bar shaped units that have the same amount and ratio of cereal flour to fluid-milk as found in a traditional bowl of cereal and milk. These smooth, homogenous-consistency textured bar shaped units have a moisture content higher than 35% and a taste similar to the traditional (RTE) dry, low-density cereal pieces and fluid-milk combination.

Formula: Cereal and Milk in a Cookie

Fluid-Milk Component

| Ingredients | Percent |
| --- | --- |
| Fat-free fluid-milk | 70.00 |
| Sucrose | 6.75 |
| Salt | 0.85 |
| Distilled Glycerol Monostearate | 0.15 |
| Lecithin | 0.05 |
| Color and flavor | 0.20 |
| Total | 78.00 |

Cereal Flour Component

| Ingredients | Percent |
| --- | --- |
| Rice flour | 11.00 |
| Oat flour | 11.00 |
| Total: | 22.00 |

Process: Cereal and Milk in a Cookie

In the first step of this process both the fluid milk component and the cereal flour component are individually pre-blended. Then, both components are simultaneously metered into the continuous steam-jacketed cooker equipped with steam jackets and scraper agitators at the ratio of fluid-milk component to cereal flour component. and cooked and starch-complexed at 185F and then discharged from said cooker as a viscous sheet of starch-complexed, fluid-milk-hydrated cereal flour which continuous to absorb adhering fluid-milk and increase in viscosity. When said starch-complexed, fluid-milk-hydrated cereal flour becomes fully-cooked, fully-hydrated and viscous enough to retain its shape said sheet is cut into bar shaped units with rotary and guillotine cutters. The individual cereal and milk bar shaped units are then oven-baked at temperatures above 300 F in a continuous oven in a manner that will firm their textures while retaining a higher than 35% moisture content.

EXAMPLE 2

Higher than 35% Moisture, Smooth-Textured Rice Fries

This example teaches a process for making a higher than 35% moisture, smooth, "homogeneous-consistency textured" cereal flour product from water and rice flour.

Formula: Higher than 35% Moisture, Smooth-Textured Rice Fries Water Component

| Ingredients | Percent |
| --- | --- |
| Water | 70.00 |
| Flavor | 6.00 |
| Salt | 0.80 |
| Distilled Glycerol Monostearate | 0.15 |
| Lecithin | 0.05 |
| Totals | 77.00 |

Rice Flour Component

| Ingredients | Percent |
| --- | --- |
| Rice flour | 23.00 |

Process: Higher than 35% Moisture, Smooth-Textured Rice Fries

In the first step of the process, both the water component (which contains the starch complexing agents, salt, flavor and color) and the rice flour component are separately metered into the continuous steam-jacketed cooker equipped with scraper agitators (at the ratios listed in the formula) and cooked and starch-complexed at temperatures above 185 F. It is then discharged as a hot, hydrated, starch-complexed rice flour which continues to absorb retained fluid-milk until it becomes fully-cooked, fully-hydrated and viscous enough to retain a formed shape. It is then extruded from a low-shear, Double Roll Extruder equipped with square holes at its discharge die as continuous ribbons of starch-complexed, hydrated cereal flour. A guillotine cutter is then used to cut said continuous ribbons into 2-3 inch long units. The individual rice fries are then separated on the belt so they can be either oven-baked or fat-fried. When fat-fried rice fries are made, they are fat-fried at about 350F for about 60 seconds. When oven-baked rice fries are made, they are baked at temperatures between about 300F to 400 F. The heating step is required to firm the units' textures while still retaining a higher than 35% moisture content. If desired, the units can then be refrigerated or frozen and stored frozen.

It is understood that the above described process and the above examples are simply illustrative of the application of principles of the invention and many other modifications may be made without departing from the spirit and scope of the invention.

The embodiments of the invention in which an exclusive property or privilege is claimed are defined as follows.

We claim:

1. A process for producing from cereal flour and fluid-milk, fully-cooked shaped cereal and milk products having a smooth, homogenous-consistency texture and a moisture content higher than 35%; said process is comprised of:
   a) cooking each pound of dry, raw, cereal flour with three to four pounds of fluid-milk together with starch-complexing agents at temperatures above 175 F in a scraped-surface continuous-cooker to produce starch-complexed, fluid-milk-hydrated cereal flour;
   b) forming the starch-complexed, fluid-milk-hydrated cereal flour of 1a) into shaped units when said hydrated-cereal flour becomes fully-cooked, fully-hydrated and viscous enough to retain a shape;
   c) oven-baking the units of 1b) at temperatures above 300 F in a manner that will firm their textures while retaining a higher than 35% moisture content.

2. The process set forth in claim 1 wherein the fluid-milk that is cooked with the cereal flour is selected from the group consisting of full-fat fluid-milk, low-fat fluid-milk, fat-free fluid-milk, buttermilk, concentrated milk diluted with water or powdered milk diluted with water, powdered whey, whey proteins, powdered milk proteins and combinations thereof.

3. The process of claim 1 wherein the cereal flour that is cooked with the fluid-milk is made by milling cereal grains selected from the group consisting of corn, oats, rice, wheat, barley, rye and combinations thereof.

4. The process set forth in claim 1 wherein the cereal flour and fluid-milk are cooked together with starch-complexing agents selected from the group consisting of lecithin, partially-hydrolyzed lecithin, enzymatically-hydrolyzed lecithin, hydrolyzed lecithin, modified lecithin, glycerol monostearate, glycerol monolaurate, glycerol monomyristate, glycerol monopalmitate, glycerol monoarachidate, glycerol monooleate, glycerol monolinoleate, fatty acid monoesters of ethylene, sorbitan fatty acids esters, fatty acid monoesters of propylene glycol, calcium stearoyl-2-lactylate, sodium stearoyl-2-lactylate, polyoxyethylene monostearate, sodium stearoyl fumarate, succinylated monoglycerides, and combinations thereof.

5. The process set forth in claim 1 which further comprises adding to the cooker and cooking together with the cereal flour and fluid-milk, ingredients selected from the group consisting of food flavors, food colors, sugar, sugar substitutes such as Splenda and Aspartame, fat, oil, butter, cheese, salt, gums, starch binders, nutritional supplements and combinations thereof.

6. The process set forth in claim 1 whereby cereal and milk bar-shaped units are formed by first developing a thick viscous sheet of fluid-milk-hydrated, starch-complexed, cereal flour and then cutting said sheet into bar-shaped units with rotary and guillotine cutters.

7. The process of claim 6 which further comprises pressing food particles selected from the group consisting of chocolate chips, cinnamon chips, cereal grains, raisins, nuts, diced fruit and combinations thereof onto the surface of the sheet of fluid-milk-hydrated, starch-complexed cereal flour before said sheet is cut into bar-shaped units.

8. The process set forth in claim 1 whereby round and oval cookie shapes are made by depositing fluid-milk-hydrated, starch-complexed cereal flour units from a Double Roll Former equipped with cookie-shaped depositors.

9. The process of claim 8 which further comprises pressing food particles selected from the group consisting of chocolate chips, cinnamon chips, cereal grains, raisins, nuts, diced fruit and combinations thereof onto the surface of the individual cookie shaped units.

10. The process set forth in claim 1 whereby stick-shaped units are made by extruding ribbons of fluid-milk-hydrated, starch-complexed cereal flour through the die holes of a double roll former discharge die plate and then cutting said continuous ribbons into individual units with a guillotine cutter.

11. The process of claim 1 which further comprises oven-baking the individual units of fluid-milk-hydrated, starch-complexed cereal flour in a continuous convection oven at temperatures above 300 F to firm their textures while retaining a higher than 35% moisture content.

12. The process of claim 1 which further comprises rapidly freezing and storing frozen the oven-baked units of fluid-milk-hydrated, starch-complexed cereal flour.

13. The process of claim 1 which further comprises cooling and storing at refrigerated temperatures the oven-baked units of fluid-milk-hydrated, starch-complexed cereal flour.

14. A process for producing from rice flour and water, fully-cooked rice fries products having a smooth, homogenous-consistency texture and a higher than 35% moisture content; said process is comprised of:
   a) cooking each pound of dry, raw, rice flour with three to four pounds of water together with starch-complexing agents at temperatures above 175 F in a scraped-surface continuous cooker to produce hydrated, starch-complexed, rice flour;
   b) forming the hydrated, starch-complexed rice flour of 14 a) into stick-shaped units when said hydrated rice flour becomes fully-cooked, fully-hydrated and viscous enough to retain a shape;
   c) heating the hydrated, starch-complexed rice flour units of 14 b) at temperatures above 300 F in a manner that will firm their textures while retaining a higher than 35% moisture content.

15. The process set forth in claim 14 wherein the rice flour and water are cooked together with starch complexing agents selected from the group consisting of lecithin, partially hydrolyzed lecithin, enzymatically hydrolyzed lecithin, hydrolyzed lecithin, modified lecithin, glycerol, monostearate, glycerol monolaurate, glycerol monomyristate, glycerol monopalmitate, glycerol monoarachidate, glycerol monooleate, glycerol monolinoleate, fatty acid monoesters of ethylene, sorbitan fatty acids esters, fatty acid monoesters of propylene glycol, calcium stearoyl-2-lactylate, sodium stearoyl-2-lactylate, polyoxyethylene monostearate, sodium stearoyl fumarate, succinylated monoglycerides, and combinations thereof.

16. The process set forth in claim 14 which further comprises adding to the cooker and cooking the rice flour and water with ingredients selected from the group consisting of food flavors, colors, sugar, sugar substitutes, fat, oil, butter, cheese, salt, diced vegetables, diced fruit, gums, starch binders, nutritional supplements, and combinations thereof.

17. The process set forth in claim 14 whereby rice fries are formed by extruding continuous ribbons of hydrated, starch-complexed rice flour through the die plate holes of a Double Roll Former and then cutting said continuous ribbons into units with a guillotine cutter.

18. The process of claim 14 which further comprises oven-baking the units of hydrated, starch-complexed, rice flour in a continuous convection oven at temperatures above 300 F to firm their textures while still retaining a higher than 35% moisture content.

19. The process of claim 14 which further comprises fat-frying the units of hydrated, starch-complexed, rice flour in a continuous fat fryer at temperatures above 350 F to firm their textures and develop a crust on their surface while still retaining a higher than 35% moisture content.

20. The process of claim 14 which further comprises rapidly freezing and storing frozen the units of fat-fried, hydrated, starch-complexed, rice flour.

* * * * *